Nov. 11, 1941.   W. H. FRANK ET AL   2,261,987
PANELBOARD
Filed Feb. 21, 1940   2 Sheets-Sheet 1
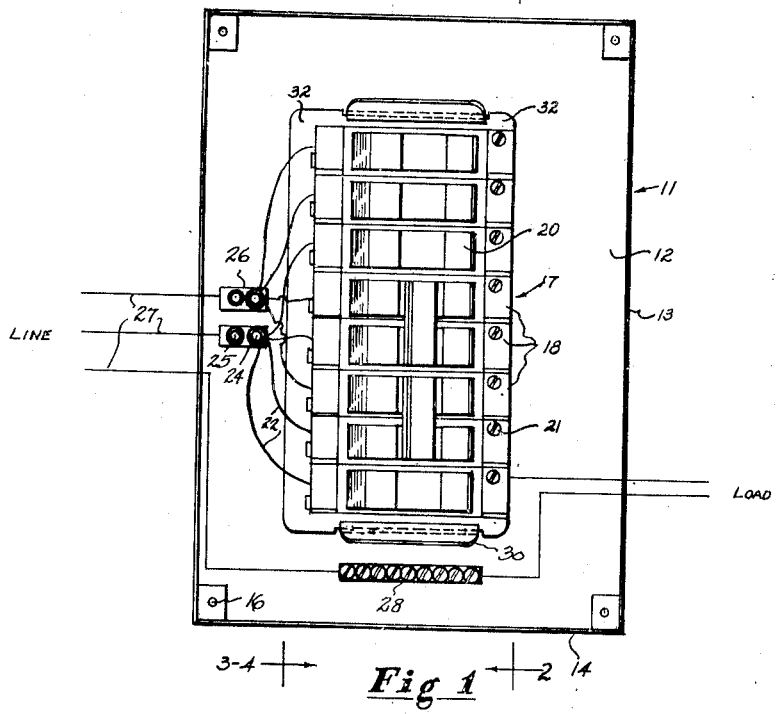
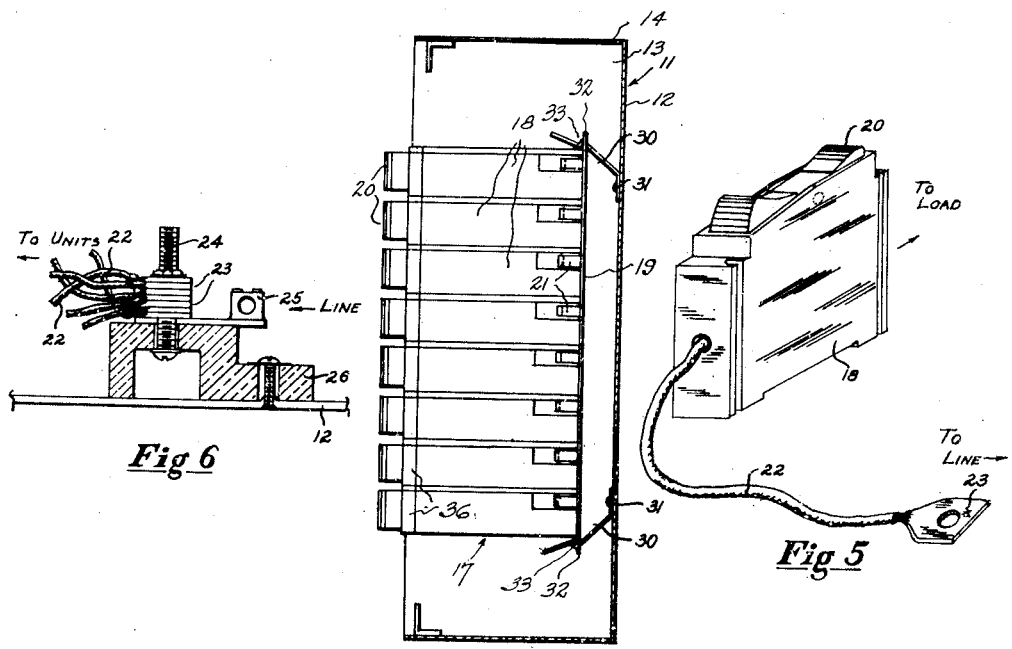
INVENTORS
William H. Frank
Robert L. Frank
BY
Daniel H. Cullen
ATTORNEY.

Nov. 11, 1941.    W. H. FRANK ET AL    2,261,987
PANELBOARD
Filed Feb. 21, 1940    2 Sheets-Sheet 2

INVENTORS
William H. Frank
& Robert L. Frank
BY
Daniel G. Cullen
ATTORNEY.

Patented Nov. 11, 1941

2,261,987

UNITED STATES PATENT OFFICE 2,261,987

PANELBOARD

William H. Frank and Robert L. Frank, Detroit, Mich., assignors to Bulldog Electric Products Company, Detroit, Mich., a corporation of West Virginia Application February 21, 1940, Serial No. 320,118

5 Claims. (Cl. 175—308)

This application relates to panelboards.

A panelboard, particularly when designed for flush mounting, generally includes a sheet metal box having an open front closed by an apertured trim plate, secured to the sides of the box, and in whose aperture is disposed the front of the panel mounted within the box, the panel generally having a mounting plate on which the units of the panel are themselves mounted. For panelboards there have been provided numerous and various arrangements for mounting the panel in the box and for obtaining the necessary accurate leveling and alignment of the panelboard parts with respect to one another and to the plaster of the wall in which the panelboard is to be disposed.

This application discloses a novel arrangement for mounting a panel in a box and for accurately leveling and aligning the panelboard parts.

One common fault of the various arrangements provided for leveling and accurately aligning the panelboard parts is the feature that these arrangements require some degree of manipulation by the installing electrician and these installers often neglect to manipulate the leveling arrangements and thus attain accurate leveling and aligning of the panelboard parts. This fault is not inherent to the arrangement herein disclosed since this arrangement is automatic in its operation, insuring accurate leveling and aligning of the parts without requiring any manipulation for this purpose by the installer.

Another feature of the arrangement herein disclosed for mounting panels in panelboards is the convenience of its use and the ease with which a panel may be mounted in or removed from a box.

Still another feature is the simplicity of the panel mounting arrangement herein shown.

Still another feature is the characteristic that the mounting arrangement provides a two position mounting for the panel. In one position the panel is deep within the box. In another position the panel is projected considerably in front of the box, whereby access to the terminal connection screws on the vertical sides of the panel, that is to say on ends of the units of the panel, is provided.

Another feature is the characteristic that the panel is permitted to have a limited amount of sidewise shifting in the box, to permit play, and to give greater access to the sides of the panel.

For an understanding of the mounting arrangements herein disclosed, reference should be had to the appended drawings. In these drawings, Fig. 1 is a front view with trim plate removed;

Figs. 2 and 3 are transverse views showing two different forms of panel mounting means with the form of Fig. 2 providing but one position for the panel, and with the form of Fig. 3 providing two different positions of the panel.

Fig. 5 shows a unit of the panel.

Fig. 6 shows a connector for the panel.

Figure 3:
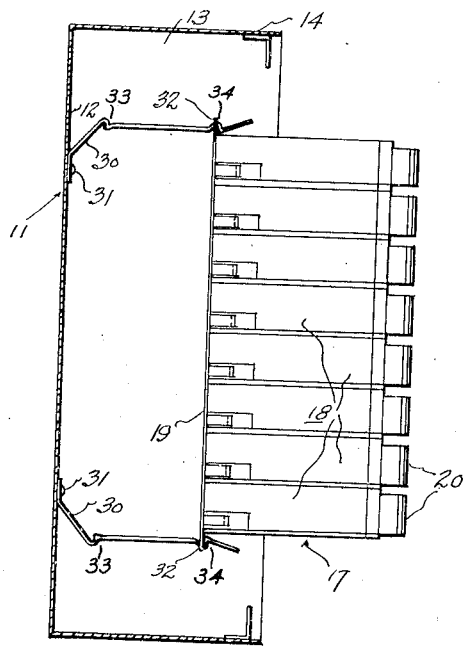

The drawings show a flush mounted panel board disposed in a recess of a wall 10 and including a box 11 having a vertical back 12, vertical and horizontal sides 13—14, and an open front normally closed by a trim plate 15 secured to the box by screws 16 and having a large central opening in which is disposed the front portion of a panel referenced as a whole 17 and consisting of numerous units 18 mounted on a mounting plate 19. The units shown are of the type disclosed in Patent No. 2,131,800 of October 4, 1938, except that they have rocker handles 20 instead of the rotary handles shown in the patent. The vertical sides of the panel 17, that is to say the ends of the units 18 are formed with branch conductor terminal binding means 21, and at the fronts of the units are the switching handles 20, these projecting beyond the trim plate so as to be accessible for switching manipulation.

Figure 4:
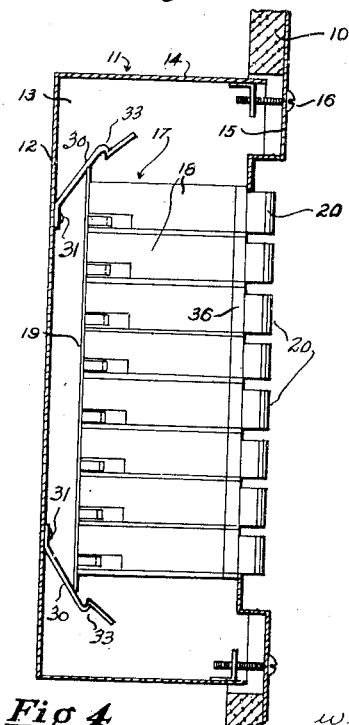
Fig. 4 is another transverse view but showing the trim plate in place.

The units, as shown in Fig. 5, may have, in addition to the load conductor binding means 21, and instead of similar binding means for the line conductors, as in Figs. 3—4, flexible line conductors 22 projecting from ends thereof and terminating in lugs 23 adapted to be connected, by studs 24 to binding means 25 mounted on blocks 26 secured to the box back, between the panel and the box sides. The supply lines 27 for the panel may be connected to the binding means 25 for connecting the panel to the supply.

The studs 24 may be replaced by bus bars, not shown, but similar in form to the neutral bar 28, and arranged to extend vertically of the panel, and having many studs to which the lugs 23 may be connected individually.

For mounting the panel a novel panel mounting arrangement has been provided and the same will now be described.

Spring leaves 30 are secured, as by rivets 31, to the back of the box, and project forwardly. These leaves are positioned one above and one below the horizontal edges of the panel mounting plate 19, engaging such edges between shoulders 32 of the mounting plate which limit movement of the panel with respect to the leaves and the box horizontally towards the vertical sides of the box. Limited sidewise movement is desirable to permit the panel to align itself accurately to the aperture in the trim plate.

If desired, the distance between the shoulders 32 of the mounting plate may be made considerably greater than the width of the spring leaves to permit the panel to be slid a considerable distance sidewise and give greater access to either side of the panel and facilitate wiring.

The leaves have horizontally extending facing grooves 33 formed by beads and these grooves receive horizontal edges of the panel mounting plate 19, between the shoulders 32.

The use of the mounting arrangement herein shown is as follows:

When a panel is to be mounted in a box, the lower edge of mounting plate 19 is seated within a groove 33 of the lower spring leaf 30 which then takes the weight of the panel, and then the upper part of the panel is swung rearwardly until the upper edge of mounting plate 19 snaps into groove 33 of the upper spring leaf.

After a panel is inserted into the box in the manner just described and mounted therein on the spring leaves 30 the trim plate 15 may be applied to the front of the box with the edge of its central aperture telescoping the panel, being in front of and abutting ledges 36 on the ends of the units, that is, on the vertical sides of the panel. The installer will push the trim plate rearwardly, manually and by threading down of screws 16, until the trim plate fits close against the wall 10 and this will push the panel back as much as necessary for leveling, the front of the panel however, at all times, tightly closing and filling and engaging the edges of the trim plate hole for satisfactory leveling.

Most often the panel will be forced back sufficiently to cause its mounting plate 19 to leave grooves 33 of the spring leaves 30 and the panel will slide back along these leaves, as in Fig. 4, as much as necessary to give satisfactory leveling at the front. The spring leaves, even under such conditions, will still support the panel in the box resiliently and satisfactorily, with sidewise shifting of the panel being controlled by the shoulders 32 of the mounting plate between which are the spring leaves.

On removal of a trim plate, the panel will slide downwardly and forwardly a slight distance and the leaves will move toward each other until the edges of the mounting plate are once more seated in the grooves 33 of the spring leaves 30 and thus removal of a mounting plate will not cause the panel to drop out of the box.

For removal of a panel it is necessary for the user to raise the free end of the upper spring leaf to clear the groove of that leaf from the upper edge of plate 19, after which the upper part of the panel may be swung forwardly to clear the box and then the panel may be lifted off the lower leaf 30 and out of the box.

It will be seen that accidental removal of a panel from a box is impossible. The panel cannot fall out or be pulled out in any way except by raising the free end or forward end of the upper spring leaf and this is not apt to happen except with the intent of the user. Any application of force tending to pull the panel forward, except when the forward end of the upper spring leaf is raised, will tend to enhance the gripping action of the spring leaves and the grooves on the panel, and thus defeat any tendency of the panel to be pulled out except intentionally.

When the trim plate is mounted the panel location is determined by that trim plate for the trim plate can cause the panel to move sidewise as well as forward and back on the spring leaves, the sidewise play being determined by the relative width of the spring leaves and the distance between the shoulders 32 and the mounting plate, and rearward position being determined by the rearward thrust of the trim plate on the panel.

In the embodiment of Fig. 3 the leaves are longer than the corresponding leaves of the embodiment shown in Fig. 2 and are provided with a second set 34 of grooves, forward of the set 33; these provide a mounted and supported position of the panel considerable forward of the position provided when only one set of grooves 33 is formed on the spring leaves. The forward position determined by the grooves 34, gives greater access to the terminal binding means 21 on the sides of the panel, projected well forward of the box, but still supported by the box and its spring leaves.

Now having described the panel board here shown, reference should be had to be claims that follow.

We claim:

1. A box having sides, a back and an open front, a device within the box, and sufficiently smaller than the box to be remote from the box sides, a trim plate secured directly to the box independent of the device and having an aperture providing access to the front of the device, the aperture being so small that its edges are remote from the box sides, the device having portions engaging the rear surface of the trim plate and portions projecting into the aperture of the trim plate so as to fill it, spring leaves permanently secured to the box and formed for detachably interlocking to the edges of the device for supporting it and for biasing it towards and against the trim plate to close the aperture thereof, the spring leaves supporting the device, independently of the trim plate, in the absence of the trim plate from the box.

2. A box having sides, a back and an open front, a device within the box, and sufficiently smaller than the box to be remote from the box sides, a trim plate secured directly to the box independent of the device and having an aperture providing access to the front of the device, the aperture being so small that its edges are remote from the box sides, the device having portions engaging the rear surface of the trim plate and portions projecting into the aperture of the trim plate so as to fill it, spring leaves permanently secured to the box and formed for detachably interlocking to the edges of the device for supporting it and for biasing it towards and against the trim plate to close the aperture thereof, the spring leaves supporting the device, independently of the trim plate, in the absence of the trim plate from the box, the leaves being arranged above and below the device so that horizontal edges thereof are gripped by the leaves.

3. A box having sides, a back and an open front, a device within the box, and sufficiently smaller than the box to be remote from the box sides, a trim plate secured directly to the box independent of the device and having an aperture providing access to the front of the device, the aperture being so small that its edges are remote from the box sides, the device having portions engaging the rear surface of the trim plate and portions projecting into the aperture of the trim plate so as to fill it, spring leaves permanently secured to the box and formed for detachably interlocking to the edges of the device for supporting it and for biasing it towards and against the trim plate to close the aperture thereof, the spring leaves supporting the device, independently of the trim plate, in the absence of the trim plate from the box, the leaves being arranged above and below the device so that horizontal edges thereof are gripped by the leaves, the upper leaf projecting forwardly and upwardly from the box back, and the lower leaf projecting forwardly and downwardly from the box back.

4. A box having sides, a back and an open front, a device within the box, and sufficiently smaller than the box to be remote from the box sides, a trim plate secured directly to the box independent of the device and having an aperture providing access to the front of the device, the aperture being so small that its edges are remote from the box sides, the device having portions engaging the rear surface of the trim plate and portions projecting into the aperture of the trim plate so as to fill it, spring leaves permanently secured to the box and formed for detachably interlocking to the edges of the device for supporting it and for biasing it towards and against the trim plate to close the aperture thereof, the spring leaves supporting the device, independently of the trim plate, in the absence of the trim plate from the box, the device having portions engaging the aperture edges whereby sidewise shifting of the device is restrained by the trim plate.

5. A box having sides, a back and an open front, a device within the box, and sufficiently smaller than the box to be remote from the box sides, a trim plate secured directly to the box independent of the device and having an aperture providing access to the front of the device, the aperture being so small that its edges are remote from the box sides, the device having portions engaging the rear surface of the trim plate and portions projecting into the aperture of the trim plate so as to fill it, spring leaves permanently secured to the box and formed for detachably interlocking to the edges of the device for supporting it and for biasing it towards and against the trim plate to close the aperture thereof, the spring leaves supporting the device, independently of the trim plate, in the absence of the trim plate from the box, the device having portions engaging the aperture edges whereby sidewise shifting of the device is restrained by the trim plate, the device being movable, while supported by the leaves, in a direction parallel to the box back, to respond to lateral shifting of the trim plate.

WILLIAM H. FRANK.
ROBERT L. FRANK.